United States Patent
Woodell

(10) Patent No.: US 6,512,476 B1
(45) Date of Patent: Jan. 28, 2003

(54) ADAPTIVE RADAR SCANNING SYSTEM

(75) Inventor: Daniel L. Woodell, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/887,190

(22) Filed: Jun. 21, 2001

(51) Int. Cl.$^7$ .............................................. G01S 13/95
(52) U.S. Cl. ............................ 342/26; 342/95; 342/96
(58) Field of Search ............................ 342/26, 81, 75, 342/95, 96, 70–72

(56) References Cited

U.S. PATENT DOCUMENTS

| | | | | |
|---|---|---|---|---|
| 3,764,719 A | * | 10/1973 | Dell ............................. 434/2 |
| 4,940,987 A | * | 7/1990 | Frederick ..................... 342/180 |
| 5,049,886 A | * | 9/1991 | Seitz et al. .................. 342/185 |
| 5,202,690 A | * | 4/1993 | Frederick ..................... 342/180 |
| 5,479,173 A | * | 12/1995 | Yoshioka et al. .............. 342/70 |
| 6,236,351 B1 | * | 5/2001 | Conner et al. ................ 342/26 |
| RE37,725 E | * | 6/2002 | Yamada ....................... 342/407 |

* cited by examiner

*Primary Examiner*—Thomas H. Tarcza
*Assistant Examiner*—Isam Alsomiri
(74) *Attorney, Agent, or Firm*—Nathan O. Jensen; Kyle Eppele

(57) ABSTRACT

An adaptive radar scanning system for an aircraft includes a radar antenna that is angularly movable to scan across a full scan range. A control system operates the radar antenna to scan in an adjusted scan range based on information related to a heading of the aircraft. As a result, the radar system is able to provide more weather information in the direction of a turn, by truncating the scan range of the radar antenna in the direction away from the turn.

12 Claims, 3 Drawing Sheets

ADAPTIVE RADAR SCANNING SYSTEM

BACKGROUND OF THE INVENTION

The present invention relates to aircraft radar systems, and more particularly to an adaptive radar scanning system that adjusts a radar scan range based on factors such as changing aircraft heading to improve the usefulness of radar information during conditions such as aircraft turns.

Modern aircraft are equipped with many on-board safety and diagnostic systems, including a radar system for detecting weather patterns located generally in front of the aircraft. Radar antennas in radar systems typically operate according to a fixed azimuth scanning pattern. In an exemplary system, the antenna scans at a fixed 45 degree per second rate from +90 degrees to −90 degrees and back with respect to the nose of the aircraft. In some modes of operation, this "revisit rate" may be even slower, since more sophisticated systems often utilize the radar antenna for other tasks in addition to the traditional weather scan. A typical revisit time (the maximum time required for a point to be successively scanned) is between about 8 seconds and about 30 seconds, with even longer revisit times anticipated for future radar systems that provide additional radar features.

In most situations, these revisit rates are acceptable, since weather patterns do not typically change in sub-minute intervals. However, fixed scanning systems can leave fairly large unscanned regions during a turn, when the heading of the aircraft is changing. For example, in a standard 3 degree per second turn of the aircraft, a revisit time of 8 seconds can leave a region of about 20 degrees in the direction of the turn unscanned, while a revisit time of 30 seconds can leave a region of about 70 degrees in the direction of the turn unscanned. Since the weather patterns in the direction of the turn are exactly what the pilot is interested in, to determine what the weather looks like in the direction the aircraft will be heading, these unscanned regions can be problematic. The pilot can potentially be left with very little time to avoid an inclement weather pattern once the aircraft's turn has been completed.

It would improve the performance of the aircraft radar system to adaptively adjust the scanning range of the radar antenna to compensate for the changing heading of the aircraft during a turn. Such a system is the subject of the present invention.

BRIEF SUMMARY OF THE INVENTION

The present invention is an adaptive radar scanning system for an aircraft. A radar antenna is angularly movable to scan across a full scan range. A control system operates the radar antenna to scan in an adjusted scan range based on information related to a heading of the aircraft. As a result, the radar system is able to provide more weather information in the direction of a turn, by truncating the scan range of the radar antenna in the direction away from the turn.

DETAILED DESCRIPTION

Figure 1:
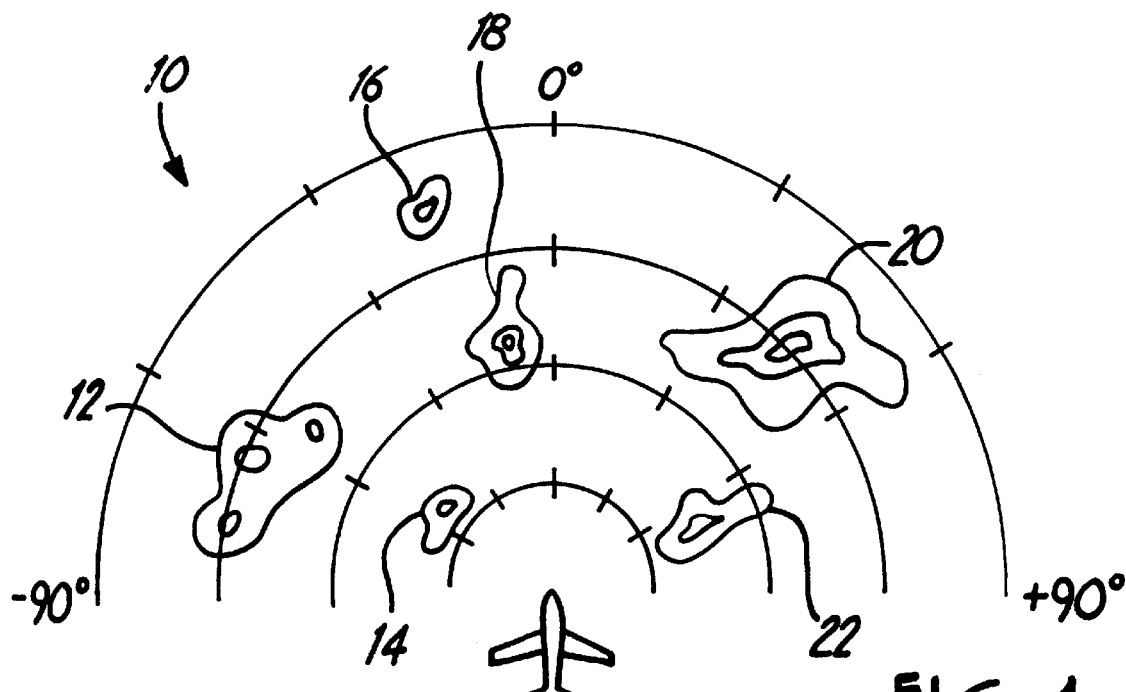
FIG. 1 is a diagram of an aircraft weather radar display according to the prior art before commencing a turn of the aircraft.

FIG. 1 is a diagram of aircraft weather radar display 10 according to the prior art before commencing a turn of the aircraft. As shown on radar display 10, weather patterns 12, 14, 16, 18, 20 and 22 are detected in a radar azimuth scan from +90 degrees to −90 degrees and back from the nose of the aircraft. For a system having an angular scan rate of about 45 degrees per second, the time required to scan from +90 degrees to −90 degrees and back (the revisit time) is about 8 seconds. This revisit time may be larger for radar systems that divert the radar antenna to other tasks during the scan.

Figure 2:
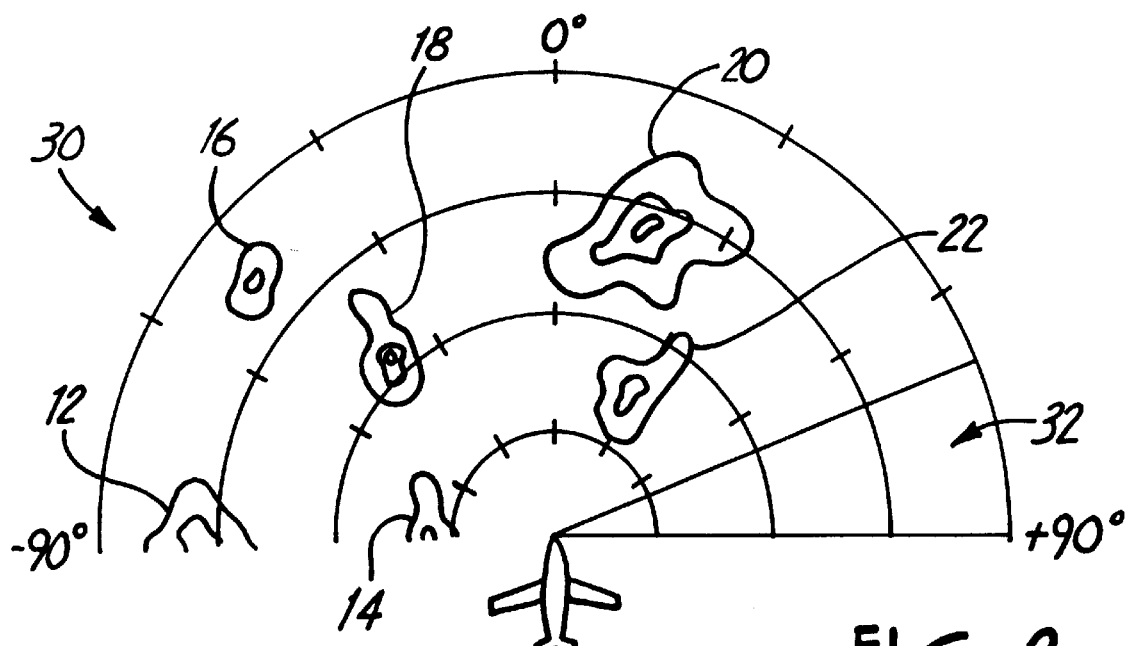
FIG. 2 is a diagram of an aircraft weather radar display according to the prior art after a period of turning of the aircraft.

FIG. 2 is a diagram of aircraft weather radar display 30 according to the prior art after an approximately 8 second period of turning the aircraft at +3 degrees per second (to the right on display 30). Weather patterns 12, 14, 16, 18, 20 and 22 are again detected in the radar azimuth scan from +90 degrees to −90 degrees and back from the nose of the aircraft, with their angular location adjusted because of the change in the heading of the aircraft during the turn. As the radar scan returns to an angle of +90 degrees from the nose of the aircraft, region 32 (in the direction of the turn of the aircraft) is left unscanned until the very end of the revisit time, which in the example shown in FIG. 2 is 8 seconds. Thus, for a period of time slightly less than the revisit time, region 32, is left unscanned, and no weather information is available for that region. A longer revisit time results in a larger extent of unscanned region 32, with region 32 having an angular size of about 20 degrees for an 8 second revisit time and having an angular size that extends to about 70 degrees for a 30 second revisit time. It will be understood by those skilled in the art that the unscanned region further increases in size for longer revisit times.

Figure 3:
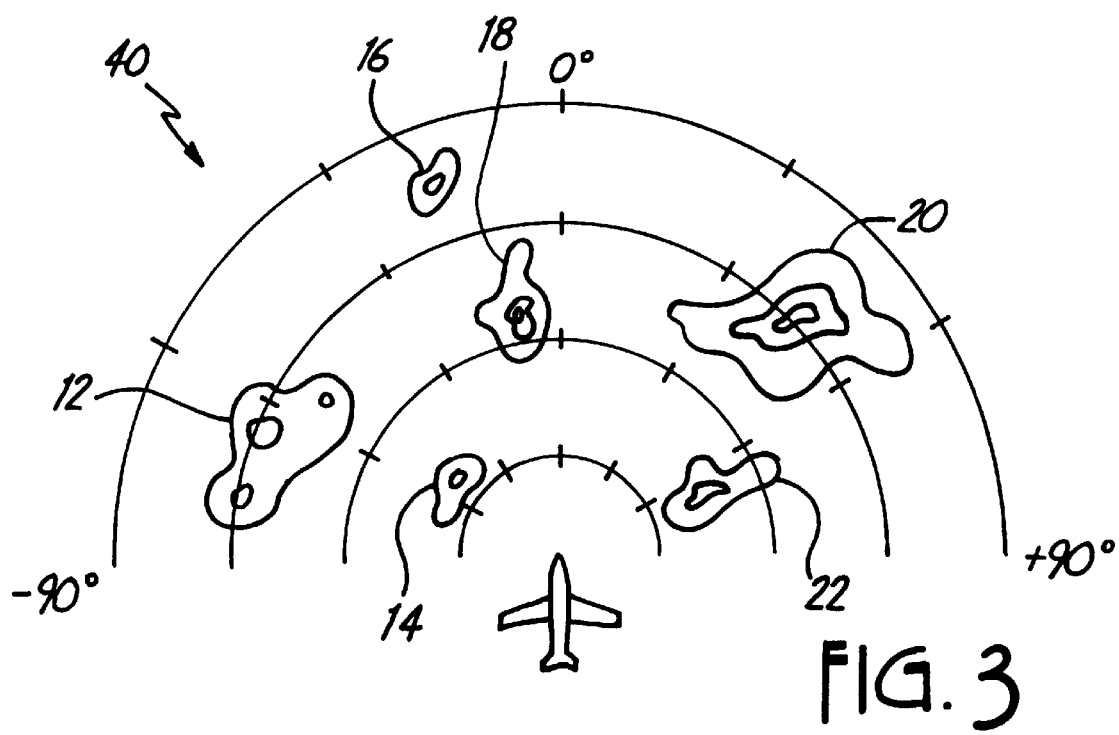
FIG. 3 is a diagram of an aircraft weather radar display according to the present invention before commencing a turn of the aircraft.

FIG. 3 is a diagram of aircraft weather radar display 40 according to the present invention before commencing a turn of the aircraft. As shown on radar display 40, weather patterns 12, 14, 16, 18, 20 and 22 are detected in a radar azimuth scan from +90 degrees to −90 degrees and back from the nose of the aircraft. For a system having an angular scan rate of about 45 degrees per second, the time required to scan from +90 degrees to −90 degrees and back (the revisit time) is about 8 seconds. A standard full azimuth scan is performed in accordance with the present invention when the aircraft is not performing a turn.

Figure 4:
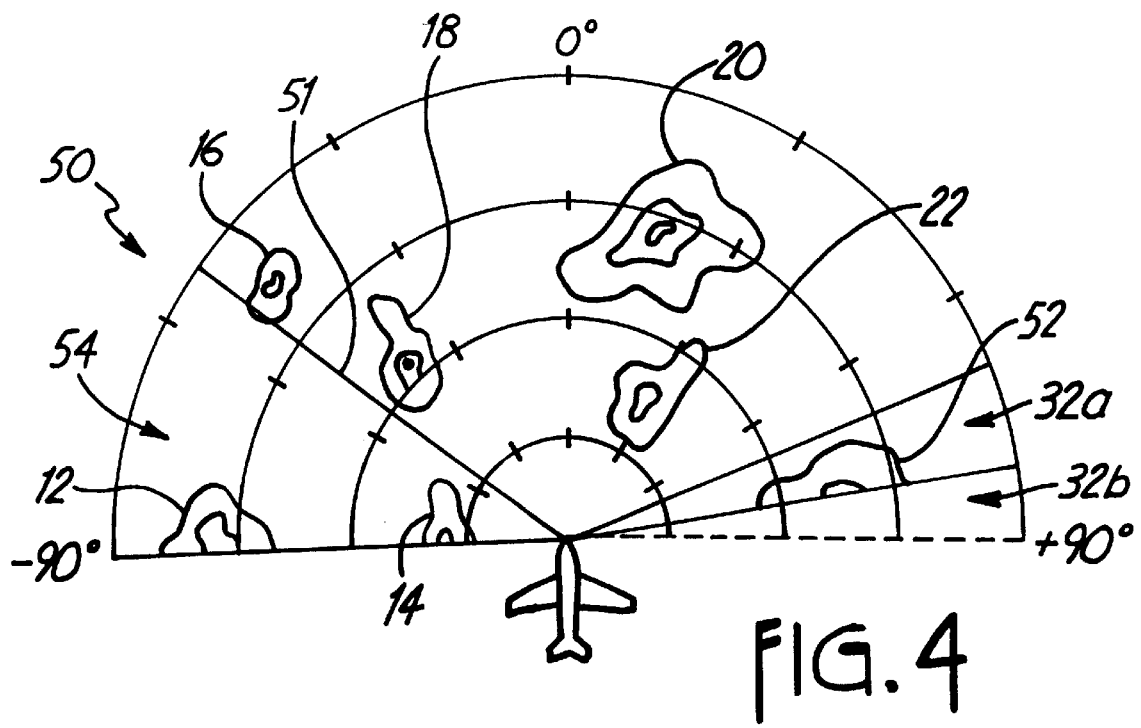
FIG. 4 is a diagram of an aircraft weather radar display according to the present invention after a period of turning of the aircraft.

FIG. 4 is a diagram of aircraft weather radar display 50 according to the present invention after a period of slightly less than 8 seconds of turning the aircraft at +3 degrees per second (to the right on display 50). The scanning pattern of the radar antenna employed by the aircraft is modified in accordance with the present invention, so that the full azimuth scan range is not traversed during the aircraft turn. Instead, the radar system takes into account that the aircraft is turning to the right, and terminates the extent of the radar scan at the angle indicated by line 51, before reaching −90 degrees from the nose of the aircraft. As a result, the revisit time of the radar system is effectively reduced. This allows the radar system to scan region 32a that would have been left unscanned in the prior art radar system display shown in FIG. 2, leaving unscanned region 32b with a substantially reduced size compared to prior art unscanned region 32 shown in FIG. 2. In some cases, such as is shown in the example of FIG. 4, this improved scanning capability enables the pilot to detect weather pattern 52 that would not have been detected by a prior art system until a later time, thereby increasing the amount of time available for the pilot to react to the presence of weather pattern 52.

In order to provide complete radar display 50, a memory is employed to project the location of weather patterns that are not scanned due to the truncation of the scan during an aircraft turn. In the example shown in FIG. 4, a region 54, which includes radar patterns 12 and 14, is not scanned during the aircraft turn, since the radar scan is truncated at line 51. Weather patterns 12 and 14, which were detected before the turn began (as shown in FIG. 3), are stored in a memory and their locations are projected based on the changing heading and position of the aircraft. Since these weather patterns are in the direction opposite to the direction of the turn, their exact location and size are not critical to the pilot, particularly compared to weather patterns in the direction of the turn.

Figure 5:
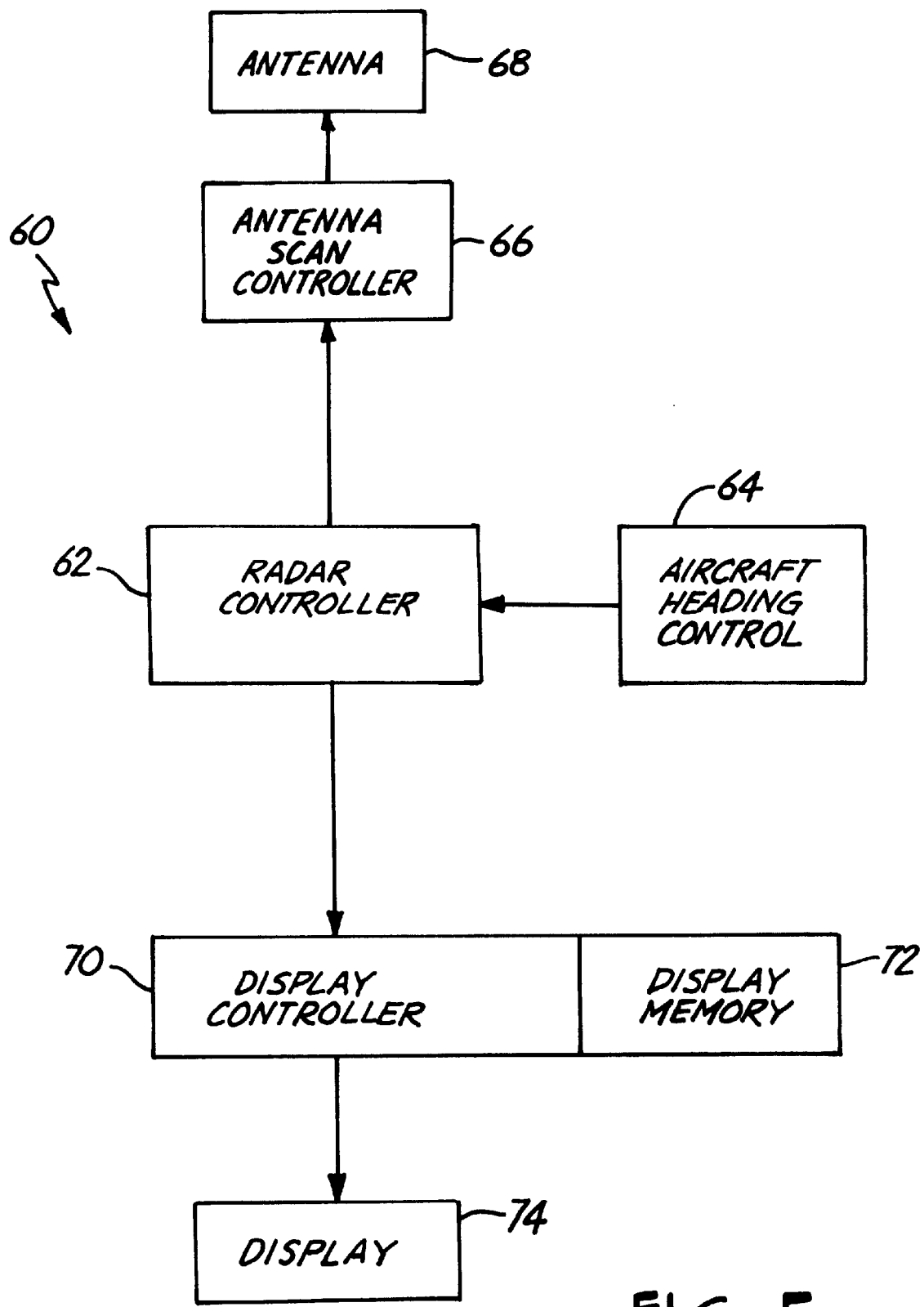
FIG. 5 is a functional block diagram of the adaptive radar control system of the present invention.

FIG. 5 is a functional block diagram of adaptive radar control system 60 of the present invention. Radar controller 62 is equipped with an appropriately programmed processor to receive signals from aircraft heading control block 64 that are representative of changes in aircraft heading. In an exemplary embodiment, the aircraft heading signals provide information relating to the rate of change in the aircraft heading (turning rate) as well as the scheduled duration of the turn, so that radar controller 62 may control the radar system appropriately. Radar controller 62 is operatively connected to antenna scan controller 66, which receives control signals from radar controller 62 and converts those control signals into antenna scan commands for operating radar antenna 68. Radar controller 62 is also operatively connected to display controller 70. Display controller includes display memory 72, which stores information relating to the size and location of detected weather patterns. Display controller 70 receives control signals from radar controller 62 and converts those control signals into display control commands for operating display 74.

The operation of adaptive radar control system 60 of the present invention may be best understood with reference to the exemplary situation shown by radar displays 40 and 50 of FIGS. 3 and 4. An initial radar scan, while the aircraft is at a constant heading, is performed to yield display 40 shown in FIG. 3. During the constant heading condition, aircraft heading control block 64 provides signals to radar controller 62 indicating that the aircraft is at a constant heading. Radar controller 62 provides control signals to antenna scan controller 66 to indicate that a full scan should be performed, and antenna scan controller 66 operates radar antenna 68 accordingly. Radar controller 62 also provides control signals to display controller 70, indicating that the data obtained by radar antenna 68 should be displayed in a normal manner, and display controller 70 operates display 74 accordingly.

During a turn of the aircraft, a modified radar scan is performed to yield display 50 shown in FIG. 4. During the turning condition, aircraft heading control block 64 provides signals to radar controller 62 indicating information such as the rate and duration of the turn. Radar controller provides control signals to antenna scan controller 66 to indicate that the antenna scan range should be truncated in the direction away from the turn at a particular termination angle (shown by line 51 in FIG. 4). This allows the radar system to provide more information in the direction of the turn. Antenna scan controller 66 operates radar antenna 68 accordingly. Radar controller 62 also provides control signals to display controller 70, indicating that the display controller should project the updated location of weather patterns previously detected near the termination angle (line 51, FIG. 4), since those weather patterns would not be scanned beyond the termination angle. Display controller 70 manipulates the weather pattern information stored in display memory 72 based on the changing heading of the aircraft (provided by radar controller 62 based on the information received from aircraft heading control block 64) and operates display 74 accordingly to display detected weather patterns on the majority of display 50 (FIG. 4) and the projected location of weather patterns on the portion of display 50 beyond the termination angle (line 51, FIG. 4).

The present invention therefore provides the ability to adaptively control a radar scan in order to provide weather information in directions most useful to a pilot. Based on information relating to the heading of the aircraft, the scan range of the radar antenna is adjusted to cut off the scan in the direction away from the turn, thus providing more information in the direction of the turn. A memory system is employed to project the weather information away from the turn that is not scanned, which is acceptable because of the relatively short time frames involved and because weather information away from the turn is much less important to the pilot than weather information in the direction of the turn. As a result of the present invention, the size of unscanned regions in the direction of a turn are reduced, improving the performance of the radar system and its ability to provide relevant weather information to a pilot with maximum advance notice. The present invention also enables the radar antenna to be used for other tasks in addition to standard radar scanning, such as windshear detection and other types of analysis that will be apparent to those skilled in the art, without leaving an unacceptably large unscanned region of weather in the direction of a turn of the aircraft due to increased revisit times. As a result, many additional types of information can be provided that were not available in prior art radar systems.

Although the present invention has been described with reference to preferred embodiments, workers skilled in the art will recognize that changes may be made in form and detail without departing from the spirit and scope of the invention.

What is claimed is:

1. An adaptive radar scanning system for an aircraft, comprising:
   a radar antenna angularly movable to scan across a full angular scan range; and
   a control system operatively coupled to the radar antenna to operate the radar antenna to scan in an adjusted angular scan range based on information related to a heading of the aircraft, wherein the adjusted angular scan range is angularly smaller than the full angular scan range.

2. The adaptive radar scanning system of claim 1, further comprising means for providing a signal representative of the heading of the aircraft to the control system.

3. The adaptive radar scanning system of claim 1, wherein the control system includes:
   a memory for storing weather information obtained during previous scans; and
   a display controller operating to continually display detected weather information in the adjusted angular scan range, and
   projected weather information in portions of the full angular scan range that are not in the adjusted angular scan range, the projected weather information being based on the stored weather information in the memory and on the information related to the heading of the aircraft.

4. The adaptive radar scanning system of claim 1, wherein the information related to the heading of the aircraft includes a rate of change of the heading of the aircraft and a scheduled duration of a turn of the aircraft.

5. A method of detecting weather information from an aircraft radar system, comprising:

performing a radar scan across a full angular scan range when the aircraft is at a constant heading; and performing a radar scan across an adjusted angular scan range when a heading of the aircraft is changing, the adjusted angular scan range being angularly smaller than the full angular scan range.

6. The method of claim 5, wherein the angular size of the adjusted angular scan range is related to a rate of change of the heading of the aircraft.

7. The method of claim 6, wherein the change in heading is associated with a turn of the aircraft, and wherein the adjusted angular scan range is truncated in a direction away from the turn of the aircraft.

8. The method of claim 5, further comprising:

storing weather information detected by the radar scan across the full angular scan range when the aircraft is at the constant heading;

displaying on a radar display the weather information detected by the radar scan across the full scan range when the aircraft is at the constant heading; and updating the radar display when the heading of the aircraft is changing by displaying detected weather information in the adjusted angular scan range, and displaying projected weather information in portions of the full angular scan range that are not in the adjusted angular scan range, the projected weather information being based on the stored weather information and on the changing heading of the aircraft.

9. The method of claim 8, wherein the projected weather information is also based on a scheduled duration of a turn of the aircraft.

10. A method of detecting weather information from an aircraft radar system, comprising:

scanning a radar antenna across an angular scan range whose angular size is in part proportional to a rate of change of a heading of the aircraft; and displaying weather information detected by the radar antenna in the angular scan range.

11. The method of claim 10, further comprising:

storing detected weather information in a memory;

projecting weather information outside of the angular scan range based on the weather information stored in the memory and on the rate of change of the heading of the aircraft; and displaying the projected weather information.

12. The method of claim 10, wherein the scan range is truncated in a direction away from a turn of the aircraft.

* * * * *